United States Patent [19]

Blicher

[11] Patent Number: 4,604,970

[45] Date of Patent: Aug. 12, 1986

[54] ANIMAL FEEDING METHOD AND APPARATUS

[76] Inventor: Steen Blicher, Dalkildegaard, DK-5600 Faaborg, Denmark

[21] Appl. No.: 599,759

[22] Filed: Apr. 13, 1984

[30] Foreign Application Priority Data

Apr. 14, 1983 [DK] Denmark ............................ 1644/83

[51] Int. Cl.⁴ .............................................. A01K 5/02
[52] U.S. Cl. .................................. 119/51 R; 119/51.5
[58] Field of Search .................. 119/51 R, 56 R, 51.5, 119/78

[56] References Cited

U.S. PATENT DOCUMENTS

| | | | |
|---|---|---|---|
| 1,109,009 | 9/1914 | O'Brien | 119/56 R |
| 1,207,938 | 12/1916 | Kuxmann | 119/51.5 |
| 2,960,965 | 11/1960 | Cordis | 119/78 |
| 4,429,660 | 2/1984 | Olson et al. | 119/51 R |

Primary Examiner—Hugh R. Chamblee
Attorney, Agent, or Firm—Stiefel, Gross, Kurkland & Pavane

[57] ABSTRACT

An animal feeding apparatus includes fodder supply means for supplying amounts of dry feed or fodder to one or more animal feeding places. The fodder supply means may be driven by a hydraulic motor, such as a double-acting hydraulic cylinder to which water or another aqueous liquid is supplied under superatmospheric pressure as driving medium. The aqueous liquid discharged from the hydraulic motor is distributed to the various feeding places, whereby the hydraulic motor is used as a metering device.

The fodder supply means may comprise a number of supply ducts each having a lower outlet end located above and closely spaced from an opposite fodder supporting wall, and a reciprocatable fodder pushing means arranged therebetween. The fodder pushing means has leading edge portions defining a concave shape and a through-going relief passage extending between the bottom of the concave shape and the trailing edge portions of the pushing means. Consecutive amounts of feed may be discharged from the fodder supply duct to the associated feeding place by imparting a reciprocating movement to the pushing means.

24 Claims, 11 Drawing Figures

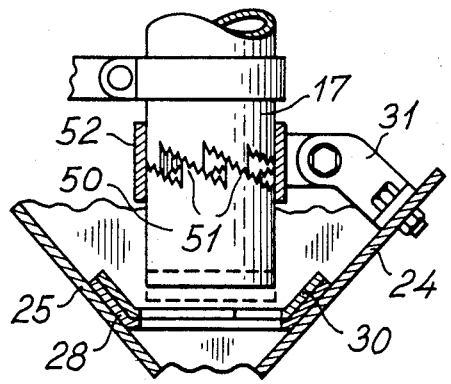
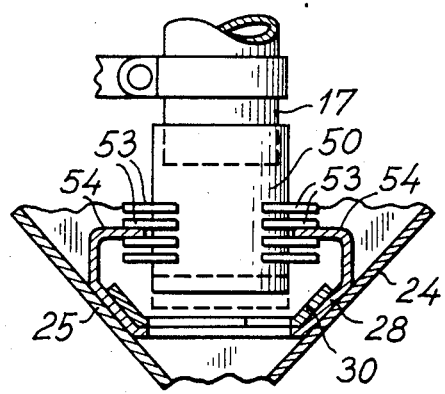
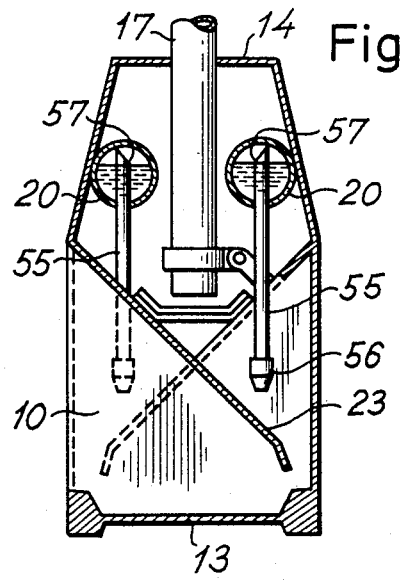
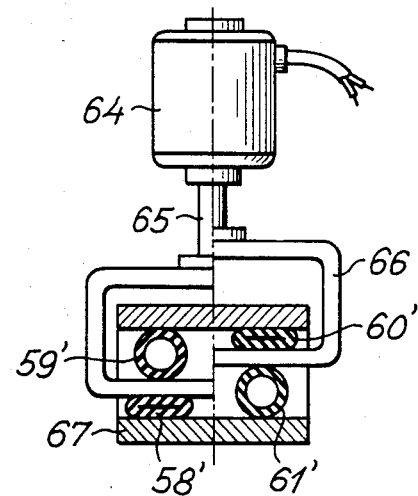
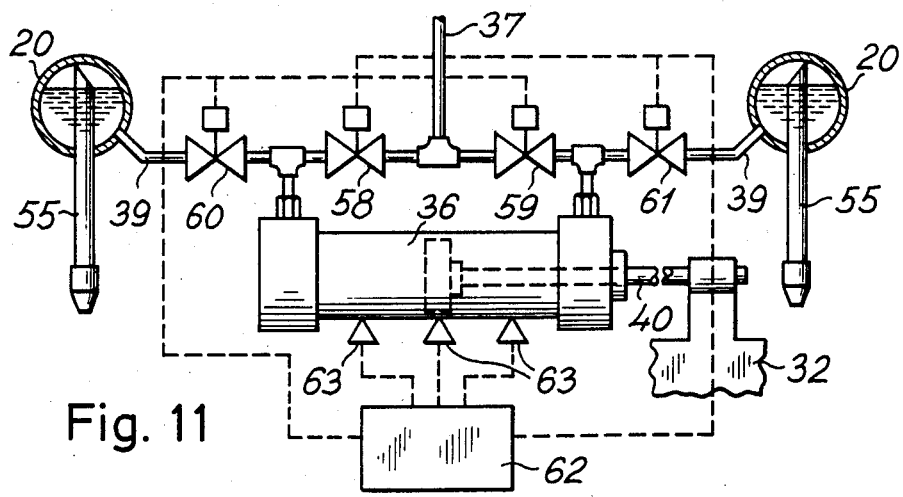

ANIMAL FEEDING METHOD AND APPARATUS

BACKGROUND OF THE INVENTION

1. Field of the Invention.

The present invention relates to a method of operating an animal feeding apparatus having fodder supply means driven by a driving device for supplying amounts of dry feed or fodder to at least one animal feeding place, and liquid supply means for supplying aqueous liquid to each of the feeding places.

2. Description of Prior Art.

In animal feeding apparatus of this type, the fodder supply means are normally driven by an electric motor, and the separate liquid supply means normally comprises one or more supply tubes provided with valves, which may be controlled by electrical or mechanical control means, or which may be actuated by the animals. It is normally desired to ensure that the dry feed or fodder and the aqueous liquid is supplied to each feeding place in predetermined relative amounts so as to obtain a mixing proportion, which is substantially optimal for the animals to be fed.

SUMMARY OF THE INVENTION

The present invention provides a method by means of which a desired mixing proportion of dry fodder and aqueous liquid at the respective feeding places may be obtained in a very simple manner.

Thus, the present invention comprises a method of operating an animal feeding apparatus having fodder supply means driven by a driving device for supplying amounts of dry feed or fodder to at least one animal feeding place, and liquid means for supplying aqueous liquid to each feeding place, said method comprising supplying the aqueous liquid to the driving device under superatmospheric pressure and using it as driving medium for operating the driving device discharging the aqueous liquid from the driving device after use and passing it to the feeding place or places.

As the rate of movement of the driving device or driving motor is substantially proportional to the rate at which the driving aqueous liquid is supplied thereto, it is possible to obtain a desired mixing proportion of the dry fodder and the liquid by feeding part of or all of the liquid discharge from the driving device to the feeding place or places. The aqueous liquid used as driving medium may, for example, be tap water, or water or an aqueous nutrient solution, which is supplied from a tank placed on a high level or otherwise supplied to the driving device under pressure.

The animal feeding apparatus may be of the type which supplies the dry fodder and/or the aqueous liquid to the feeding place or feeding places continuously or intermittently, either in small successive portions and at rate substantially corresponding to the desired eating rate of the animals, or in bigger amounts. Thus, for example the feeding apparatus may be of any of the types disclosed in British Pat. No. 2,056,837, British Pat. No. 1,467,220, and German Pat. No. 938,810.

When the feeding apparatus is of a type for supplying feed to a plurality of separate feeding places, it is normally desired to supply equal amounts of dry feed and aqueous liquid to all of the feeding places, and because the fodder supply means and the driving device therefore is common to all the feeding places, the liquid discharged from the dry medium device is advantageously fed to a liquid distributing device, in which the liquid is divided into a number of substantially equal portions corresponding to the number of feeding places, and these portions may then be supplied to the respective feeding places.

According to another aspect, the present invention also provides an animal feeding apparatus comprising fodder supply means for feeding dry feed or fodder to at least one feeding place, a hydraulic motor for driving the fodder supply means, liquid supply means for supplying aqueous liquid under superatmospheric pressure to the hydraulic motor as a driving medium so as to drive the motor, and liquid discharge means for discharging the aqueous liquid from the hydraulic motor and for passing the liquid to each feeding place. The hydraulic motor may be of any suitable type, for example, in the form of a turbine or another type of rotational hydraulic motor. In the preferred embodiment, however, the motor is of the type having a reciprocating piston or membrane, such as a hydraulic cylinder or bellows. Such an embodiment is especially advantageous, when the fodder supply means of the feeding apparatus is of the reciprocating type, and the hydraulic motor or hydraulic cylinder is then preferably double-acting. A motor of the type having a reciprocating piston or membrane may, however, also be used for driving rotative fodder supply means, for example, through a ratchet mechanism.

When the hydraulic driving motor is of the rotative type it may be constructed so that the amount of liquid consumed in relation to the total amount of dry feed or fodder supplied to feeding place or places corresponds to the most liquid-rich fodder mixture desired. When a less liquid-rich fodder mixture is desired, only part of the liquid discharged from the driving motor is passed to the feeding place or places, and the remaining part may be passed to waste or recirculated to a liquid supply tank. In case the hydraulic motor is of the type having a reciprocating piston or membrane, the driving liquid is discharged from the hydraulic motor in accurately metered portions. In that case the cross-sectional area of the cylinder or bellows may be chosen so that the maximum desired stroke of the fodder supply means may be obtained even when the minimum desired amount of driving liquid is discharged from the motor for each stroke. The piston rod of the hydraulic motor is then advantageously connected to the fodder supply means through an adjustable lost motion connection, whereby the amount of liquid discharged for each stroke may be increased without increasing the stroke length of the fodder supply means.

According to a further aspect, the present invention provides an animal feeding apparatus comprising fodder supply means for feeding feed or fodder to at least one feeding place, said fodder supply means comprising at least one fodder supply duct having a lower outlet end located above and closely spaced from an opposite fodder supporting wall, and a fodder pushing means arranged between the outlet end of the fodder supply duct and the adjacent supporting wall and being movable so as to push consecutive amounts of feed or fodder from the fodder supply duct, the fodder pushing means having leading edge portions defining a concave shape and a through-going relief passage extending between the bottom of the concave shape of the leading edge portions and the trailing edge portions of the pushing means.

The concave shape of the leading edge of the pushing means combined with the through-going relief passage causes the feed or fodder particles, which might inclined to become wedged or jammed between the moving fodder pushing means and the outlet of the fodder supply duct or other adjacent stationary edges, to move to the bottom of the concavely shaped leading edge portions of the pushing means and through the relief passage so that such wedging or jamming may be avoided. This means that only a relatively small driving force is necessary for moving the pushing means. Consequently, the pushing means may be driven by a hydraulic motor or driving device to which tap water or another liquid under a relatively low pressure is supplied. It should be understood, however, that the pushing means may also be moved by means of other kinds of driving devices, such as an electric motor, a pneumatic motor, or the like. In that case, the apparatus may be provided with conventional means for supplying metered amounts of aqueous liquid to the feeding places.

In order to avoid that fodder, which is moved by the leading edge portions of the pushing means passes through the relief passage too easily, at least part of the relief passage may extend in a direction deviating substantially from the direction of movement of the pushing means.

Normally, the apparatus is adapted to supply feed or fodder to a plurality of separate feeding places, and the apparatus may then comprise a corresponding number of spaced fodder supply ducts, which are arranged in a row, and fodder discharge openings communicating with the respective feeding places may then be defined between each pair of consecutive fodder supply ducts and below the fodder pushing means, and the fodder pushing means of the various fodder supply ducts may be interconnected and connected to a common driving device. The said row of fodder supply ducts may, for example, form a circle or an arc of a circle, and in that case the common driving device may be adapted to impart a reciprocating or continuous rotational movement to the pushing means.

The trailing edge portions of each fodder pushing means may have substantially the same concave shape as the leading edge portions thereof, and the driving device may be adapted to reciprocate the interconnected pushing means along a rectilinear or curved path with a stroke length substantially corresponding to the spacing of two adjacent discharge openings. Each of the interconnected pushing means may then be used for feeding metered amounts of feed or fodder to a pair of discharge openings from the outlet of a common fodder supply duct positioned therebetween. Thus, an amount of fodder is pushed into one of the discharge openings during a forward stroke by the leading edge portions of the pushing means and into the other of the discharge openings by the trailing edge portions of the same pushing means during the return stroke thereof.

The method and apparatus according to the invention may be used for feeding animals of various kinds, such as poultry, fur-bearing animals, cows, ducks, etc. Furthermore, the method and apparatus may be used for feeding a single animal at a single feeding place, or for feeding a plurality of animals at a common feeding place. In the preferred embodiment, however, the apparatus is adapted to supply fodder to a plurality of separate feeding places in small portions, such as a few mouthfuls, at small time intervals, as disclosed in British Pat. No. 2,056,837. Furthermore, the preferred embodiment of the apparatus is used for feeding swines or hogs, or similar social animals. When the fodder is supplied in small portions at short time intervals, the supply of a fodder amount to each of the feeding places is advantageously combined with the generation of a light or sound signal, or another signal indicating to the animal that another amount of fodder is about to be supplied to the feeding place. The light or sound signal may, for example, be such that the signal intensity increases till an amount of fodder is supplied to the feeding place in question. This may, for example, be obtained by arranging at each feeding place a light source, which is constantly shining during a feeding period. The desired change of light intensity in correspondence with the fodder supply operation may then be obtained by covering the light source by means of a masking member, which is provided with suitable cut-outs and which is connected to and movable together with the pushing means. It has been found that the use of such signals in combination with the feeding apparatus stimulates the conditioned reflexes of the animals, so that each of the animals is inclined to remain at the same feeding place during a feeding period.

BRIEF DESCRIPTION OF THE DRAWINGS

The invention will now be further described with reference to the drawings, wherein FIG. 7 is a fragmentary sectional view illustrating an adjustable outlet end of a fodder supply tube, FIG. 8 is a view corresponding to that of FIG. 7 illustrating a second embodiment, FIG. 9 is a diagrammatic cross-sectional view of the apparatus shown in FIG. 1 with an alternative liquid distributing arrangement, FIG. 10 is a valve arrangement for controlling the operation of the driving device of the fodder metering means, and FIG. 11 is a diagram illustrating the driving device and control means for controlling its operation.

DESCRIPTION OF PREFERRED EMBODIMENTS

Figure 1:
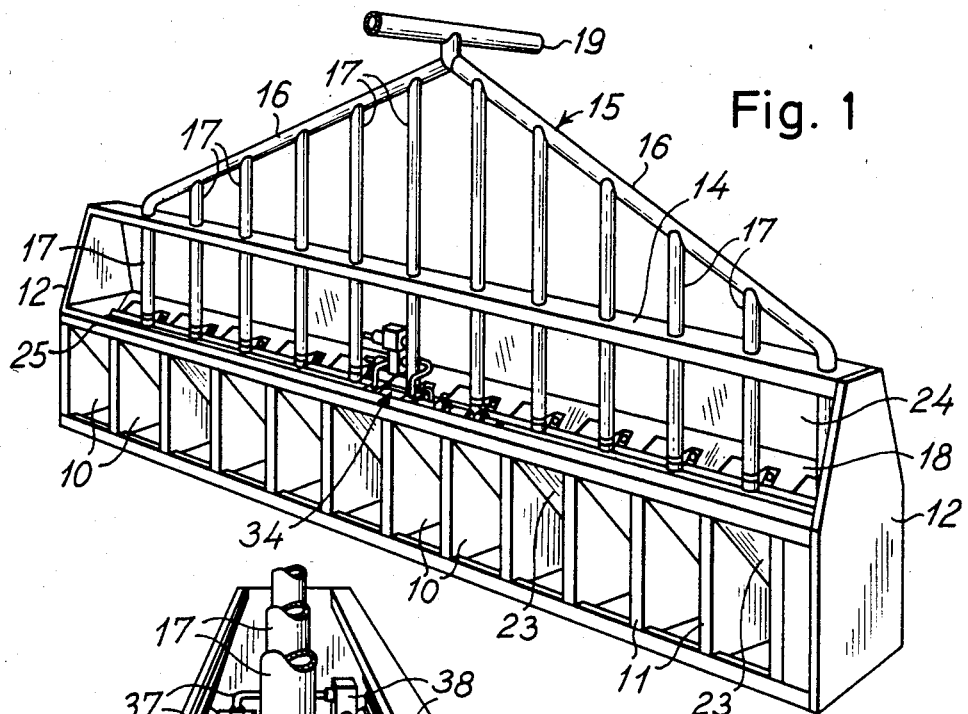
FIG. 1 is a perspective view of a preferred embodiment of the apparatus according to the invention.

FIG. 1 shows a feeding apparatus for feeding a plurality of hogs or swines, or other untethered animals housed in the same pigpen or enclosure. The apparatus is of the type which is adapted to supply small amounts of fodder corresponding to a few mouthfuls to each of a plurality of feeding places 10 at short time intervals and at a rate corresponding substantially to the desired eating rate of the animals. The feeding places 10 are separated by separating walls 11, each of which also defines a feeding place which opens to the opposite side. That means that the apparatus shown in FIG. 1 has on each side a row of eating places 10 with an inwardly decreasing width. The feeding places are surrounded by a frame structure comprising a pair of vertical intervals 12, a bottom wall 13 defining the floor of the feeding places 10, and a horizontally extending top wall 14. Thus, the feeding apparatus shown in FIG. 1 may be used as a partition wall separating two adjacent pigpens or enclosures, so that the animals housed in one of the pigpens may eat at the feeding places on one side of the apparatus, while the animals housed in the adjacent pigpen may eat at the feeding places on the other side of the apparatus. Dry feed or fodder may be supplied to the apparatus through a feed or fodder supply tube system 15 comprising a pair of sloping tubes 16 and a number of vertically extending tubes 17, each of which communicates with and extends downwardly from one of the sloping tubes 16, to a feed or fodder distributing or metering device 18, which is located above the feeding places 10. The sloping tubes 16 are connected to a tube conveyor 19, by means of which dry fodder may continuously be supplied to the fodder supply tube system 15 of a plurality of feeding apparatuses from a central feed or fodder storage silo or tank (not shown).

Figures 2, 4:
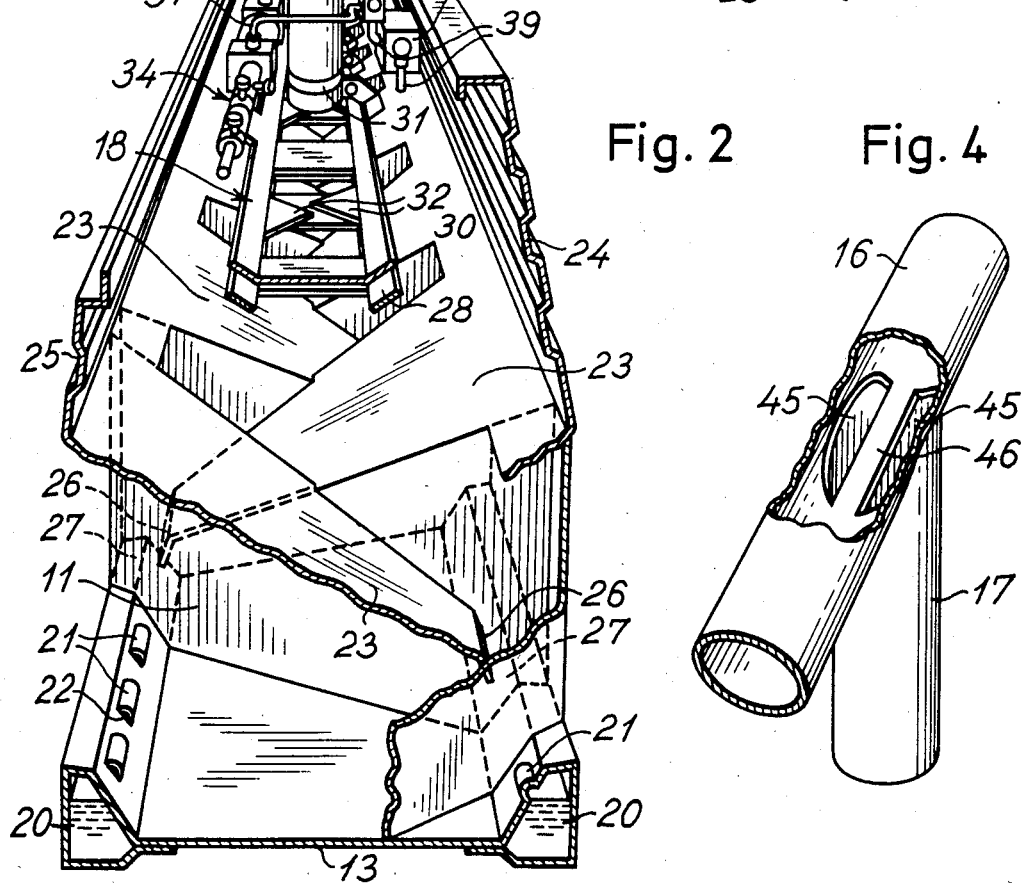
FIG. 2 is a perspective end view of the apparatus shown in FIG. 1 with parts cut away.
FIG. 4 is a perspective and partially sectional view showing a pipe joint of the fodder or feed supply tube system.

As best shown in FIG. 2 the bottom wall 13 is formed by plate metal, such as stainless steel, having longitudinal edge portions, which are bent so as to form a pair of longitudinally extending, tubular liquid chambers 20. The bottom wall 13 and the tubular chambers 20 form together a stiff, trough-like member. Each of the liquid chamber walls defining the inner side walls of the trough member has a number of semi-cylindrical bulgings 21 formed therein. Each bulging 21 defines a liquid outlet opening 22 at each end. Alle of the liquid outlet openings 22 are positioned on substantially the same level, and all of the feeding places 10 have the same number of bulgings 21.

The walls 11 separating the feeding places formed on the opposite sides of the apparatus are formed by a single, substantially vertically positioned plate member which may, for example, be made from stainless steel, and which follows a zigzag course along the length of the apparatus. At the top, the feeding places 10 are covered by cover plates 23, which may be saw-tooth-like extensions formed on oppositely arranged, corrugated side walls 24 and 25 of the apparatus. The oppositely directed cover plates 23 formed on the side walls 24 and 25 slope downwardly, so that the upper surface of each cover plate may form a chute for feed or fodder which is supplied to the feeding place located therebelow. Therefore, each of the cover plates 23 has a downwardly bent free edge portion 26 so as to define a fodder delivery passage 27 between the edge portion 26 and the adjacent side wall of the liquid chamber 20 at the innermost part of the feeding place 10 in question.

Figure 3:
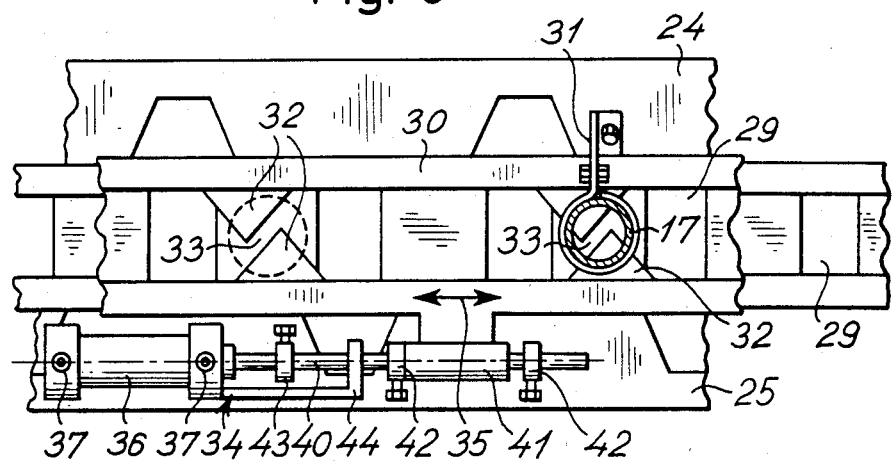
FIG. 3 is a fragmentary plan view illustrating the fodder metering means and the driving device of the metering means.

The feed or fodder distributing and metering device 18 is located above and is supported by the cover plate 23 as shown in FIG. 2. This metering device comprises a lower channel member 28 having opposite side walls engaging with the cover plate 23 and a bottom wall with a number of longitudinally spaced, substantially rectangular fodder discharge openings 29 formed therein. The number of discharge openings 29 corresponds to the number of feeding places 10, and each discharge opening is located immediately above a cover plate 23. The metering device 18 also comprises a channel-shaped slide member 30 which is slidably received in the stationary lower channel member 28 for cooperating therewith. The outlet ends of the vertical tube 17 are located immediately above the slide member 30, and a tube 17 is positioned between each pair of fodder discharge openings 20 as best illustrated in FIG. 3, and the outlet end of each tube 17 is held by a mounting member in a manner so that the vertical distance between the free end of the tube 17 and the adjacent upper surface of the slide member 30 is adjustable. The mounting member 31 may be welded or screw-fastened to the side wall 24 as indicated in FIGS. 2,3, and 7.

Longitudinally spaced pairs of oppositely directed, triangular plate members or pushing members are formed in the bottom wall of the channel-shaped slide member 30 and extend inwardly from the side walls of the slide member. The triangular plate members 32 in each pair are slightly longitudinally displaced and have overlapping free ends so as to define a relief passage 33 between the adjacent pushing members 32 of each pair, vide FIG. 3. This relief passage extends in a direction forming an acute angle with the longitudinal direction and the direction of movement of the slide member 30. Such a pair of pushing members 32 is associated with and positioned immediately below each outlet of the vertical tubes 17 in a starting position of the slide member 30. The slide member 30 and the pairs of pushing members 32 formed thereon may be reciprocated by a hydraulic driving device 34 as indicated by arrows 35 in FIG. 3. The slide member 30 is reciprocated with such a stroke length that each pair of pushing members 32 is reciprocated between the two adjacent of the fodder discharge openings 29. This means that each pair of pushing members 32 is moved from one discharge opening 29, below the outlet of the associated tube 17 and to the adjacent discharge opening 29 during a forward stroke, and along the same path in the opposite direction during their return stroke, whereby small amounts of feed or fodder supplied by the tube 17 are intermittently pushed to the adjacent discharge openings 29 as described more in detail below.

The driving device 34 comprises a hydraulic double-acting cylinder 36, and driving liquid under pressure, such as tap water, may intermittently be supplied to and discharged from the two opposite cylinder chambers of the cylinder 36 through liquid conduits 37. The supply and discharge of liquid to the chambers of the cylinder 34 is controlled by a pair of valves 38, the funtion of which may be controlled by a mechanical, pneumatic, hydraulic, or electronic control device (not shown). The valves 38 are connected to one each of the tubular liquid chambers, so that driving liquid, which is discharged from one of the cylinder chambers, is passed to one of the liquid chambers 20, while driving liquid discharged from the other of the cylinder chambers is supplied to the other liquid chamber 20. It is understood that the liquid chambers 20 function as liquid distributors, which divide the amounts of liquid supplied thereto from the hydraulic driving device 34 into substantially equal amounts which are fed to the various feeding places 10 through the liquid outlet openings 22. A piston rod 40 of the hydraulic cylinder 36 is connected to the slide member 30 through a lost motion connection comprising a sleeve member 41, which is connected to the slide member 30. The piston rod 40 extends through the bore of the sleeve member 41, and stopping members 42 which are adjustably fastened to the piston rod by means of a releasable fastening member, such as a pointed screw, may engage with the ends of the sleeve member 41. The amount of liquid to be discharged into the liquid chambers 20, and, consequently, into the various feeding places 10 for each stroke of the piston rod 40 may be adjusted by means of a stopping member 43, which is also releasably fastened to the piston rod 40, for example by means a screw. This stopping member 43 and the adjacent one of the stopping members 42 may cooperate with a stationary abutment member 44 so as to define the stroke length of the piston rod.

The various plate members and wall parts of the apparatus described above may, for example, be made from stainless steel, galvanized plate metal, and/or other non-corrosive plate material. These parts may be fastened by welding or in any other conventional manner. In the preferred embodiment, however, the plate members are clamped together by means of throughgoing bolts and clamp members, not shown.

The apparatus illustrated in FIGS. 1-3 operates as follows:

Feed or fodder is continuously supplied from the tube conveyor 19 into the vertical tubes 17, so that at any time during operation, all of the vertical tubes 17 contain a column of feed or fodder resting on the bottom wall of the lower channel member 28. The control device of the apparatus controls the function of the valves 38 so that liquid under pressure, such as tap water, is alternatingly supplied to and discharged from the chambers of the hydraulic cylinder 36 so as to impart a reciprocating movement to the slide member 30. When tap water is supplied to one of the cylinder chambers, while water is discharged from the other chamber and passed to one of the liquid chambers 20, the slide member 30 is caused to move in one direction in a forward stroke. Thereby each pair of the pushing members 32 passes the outlet of the associated vertical supply tube 17 and through the column of fodder resting on the lower channel member 28. Thus, during the forward stroke, the leading edge portions of each pair of pushing members 32 will push a small metered amount of feed or fodder along the bottom wall of the channel member 28 and down through the adjacent discharge opening 29. The fodder will then slide downwardly along the cover plate 23, through the delivery passage 27 and down into the associated feeding place 10. It is understood that during such forward movement of the slide member substantially equal amounts of feed or fodder will be supplied simultaneously to all of the feeding places 10 located at one side of the apparatus. Due to the backwardly inclined leading edge portions of the pushing members 32 and due to the relief passage 33 defined between each pair of pushing members, fodder may escape through this relief passage if any tendency to packing or jamming of fodder between the leading edge portions of the pushing members 32 and the adjacent edge portion of the tube 17 should occur. This means that only a relatively small force is necessary to move the slide member 30.

During the return stroke of the piston rod and the slide member the procedure described is repeated, but the small amounts of fodder are now supplied to the discharge openings 29 which communicate with the feeding places 10 at the other side of the apparatus. The liquid discharged from the cylinder chambers is supplied to the liquid chambers 20 as previously described. Thus, a pulsating flow of liquid will be supplied to each feeding place in synchronism with the supply of dry feed or fodder. By adjusting the position of the stopping member 43 and the adjacent stopping member 42 it is possible to adjust the stroke of the piston rod, and, consequently, the volume of liquid discharged during each stroke. Thereby, the mixing proportion of liquid and dry feed may be adjusted. By adjusting the position of the other of the stopping members 42 it is possible to adjust the lost motion movement, so that a desired stroke length of the slide member 30 may be obtained independently of the stroke length of the piston rod 40. Furthermore, the amount of fodder supplied to each feeding place 10 during each stroke may be adjusted by adjusting the distance between the lower end of each of the vertical tubes 17 and the bottom of the lower channel member 28. Finally, the frequency of the reciprocating movement may be changed as desired by means of the control device, for example so as to adapt the supply rate of feed or fodder to each feeding place to a desired eating rate of the animals.

Figure 5:
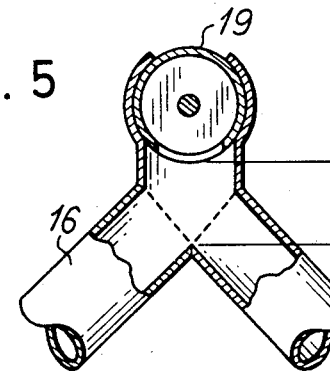
FIG. 5 is a side view and partially sectional view of a further pipe joint of the fodder or feed supply tube system.
Figure 6:
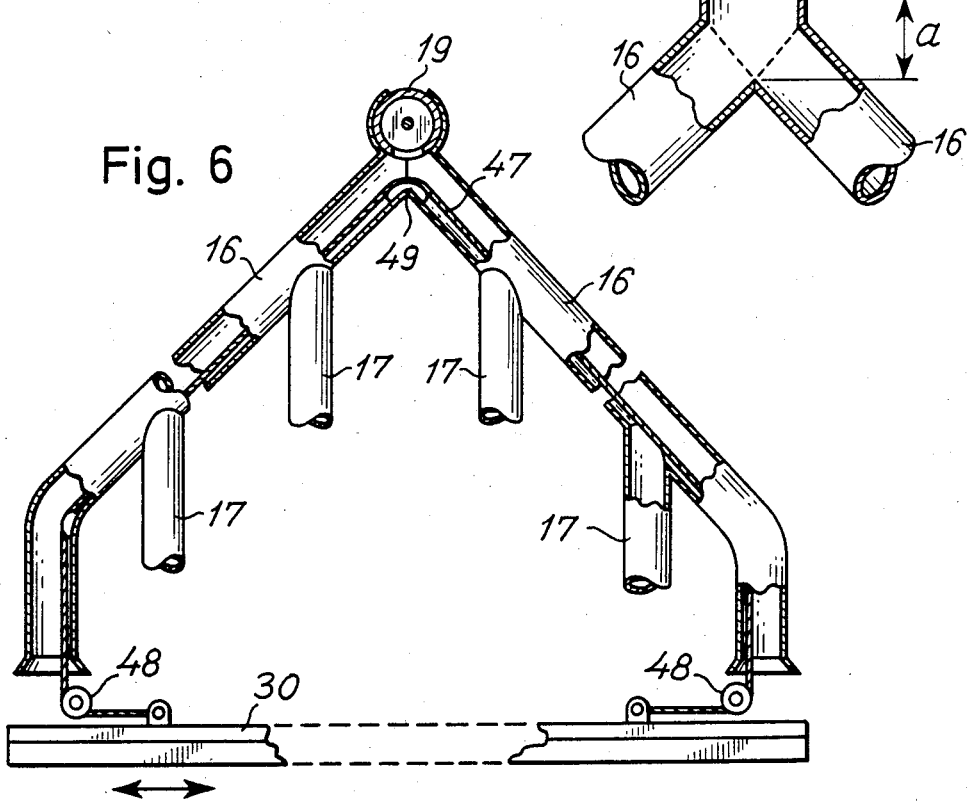
FIG. 6 is a side view and partially sectional view illustrating a modified embodiment of the fodder supply tube system.

The dry feed or fodder supplied by the tube conveyor 19 is passed through the sloping tube 16 and into the vertical tubes 17 under the influence of gravity. Therefore, special measures are made to avoid blocking of the tubes. If the upper ends of the vertical tubes 17 open into the bottom side of the sloping tubes 16 in the usual manner, dry fodder flowing through the sloping tube 16 will fall into the closest vertical tubes 17, till they are filled, and thereafter the upper part of the fodder in the filled tubes 17 will increase the friction in the sloping tubes 16 and thereby increase the blocking tendency at that location. In order to reduce this blocking tendency, each of the vertical tubes 17 may open into the respective sloping tube 16 through openings 45 formed in the bottom side of the tube 16 so as to define a lower chute portion 46 therebetween. Dry fodder flowing through the sloping tube 16 will then follow the path formed by the chute portion 46 within the vertical tube 17, vide FIG. 4. Consequently, no substantial amount of fodder will fall into the tube 17 until the part of the tube 16 located below the openings 45 has been filled. As shown in FIG. 6 the risk of blocking the sloping tubes 16 with fodder may be further reduced by arranging a wire 47 or a similar elongated flexible member within the sloping tubes 16. This wire may be passed over pulleys 48 and a stationary abutment member 49. The free ends of the wire may be connected to the slide member 30 so that the wire 47 is automatically reciprocated together with the slide member 30, when the apparatus is operating. As illustrated in FIG. 5 the risk of blocking may also be reduced by increasing the vertical distance "a" through which dry feed or fodder supplied by the tube conveyor 19 is falling freely. The wire 47 could be replaced by a separate rail or chute, which extends in the full length of each of the sloping tubes 16, and which replaces the fixed chute portion 46. These rails or chutes may then be vibrated or reciprocated during operation.

In a presently preferred embodiment the sloping tubes are replaced by tubes or troughs which have a rather small slope and are arranged between the top wall 14 and the cover plate 23. Fodder is fed to these tubes or troughs through a single vertically extending tube, and each of the sloping tubes or troughs contains a rail or chute member which is reciprocated in their longitudinal direction together with the slide member 30. These chute members are reciprocated so that their adjacent end portions are moved alternatingly towards and away from each other.

FIGS. 7 and 8 illustrate modified embodiments allowing adjustment of the vertical position of the outlet end of the vertical tubes 17. In the embodiment shown in FIG. 7 each of the vertical tubes 17 has a separate outlet 50, and a sleeve-like holder 51 of the mounting member 31 surrounds the lower part of the tube 17 as well as the upper part of the outlet with a slight fit. The lower edge of the tube 17 as well as the upper edge of the outlet 50 have corresponding interengaging serrations 52 which allow an adjustment of the distance between the lower end surface of the outlet 50 and the lower channel member 28 by turning the outlet 50 as indicated with broken lines in FIG. 7.

In the embodiment shown in FIG. 8 the outlet 50 is provided with a number of longitudinally spaced, radially oppositely extending flange portions 53 which may engage with flanges 54 formed on the channel member 28. The flange portions 53 may be brought out of engagement with the flanges 54 by turning the outlet 90°, and the outlet may then be placed in the desired vertical position, whereafter the outlet 50 may be turned back to the original rotational position.

FIG. 9 diagrammatically illustrates a modified embodiment where the tubular liquid chambers 20 are placed between the top wall 14 and the cover plate 23. A liquid discharge tube 55 communicating with the inner of one of the liquid chambers 20 has an outlet nozzle 56 arranged above the upper surface of each of the covering plates 23. The upper end of each tube 55 has an inclined end surface 57. This secures that the lower parts of the end openings of the discharge tubes 55 are all positioned at the same level, when the pointed upper ends of the tubes all engage with the upper inner walls of the tubular liquid chambers 20. This secures a uniform distribution of liquid supplied to the chambers 20 to all of the feeding places 10.

FIG. 11 diagrammatically illustrates the hydraulic cylinder 36 and the associated control system. The pressurized driving liquid, such as tap water, is supplied through the conduit 37 and one of a pair of inlet valves 58 and 59. Each of the liquid discharge conduit 39, which is connected to the liquid chambers 20, contains one of a pair of outlet valves 60 and 61. The inlet valve 58 and the outlet valve 61 are opened and closed at the same time, and this is also true for the inlet valve 59 and the outlet valve 60. When the valves 58 and 61 are open, the valves 59 and 60 are closed, and the piston rod 40 will then move to the right in FIG. 11, and liquid is discharged from the right cylinder chamber through the outlet valve 61 into the right cylinder chamber 20. When the piston of the cylinder 36 has reached a predetermined position, the valves 58 and 61 are closed, and the valves 59 and 60 are opened. The movement of the piston will now be reversed, and liquid will be discharged through the valve 60 into the left liquid chamber 20 in FIG. 11. The valves 58-61 may be solenoid valves, and their function may be controlled by an electronic control system 62. Detectors 63 may be of the magnetic, electric, or any other type which is able to detect the position of the piston within the cylinder 36. By means of these piston position detectors the control device 62 may calculate the velocity of the piston and on the basis thereof calculate the time at which the piston movement is to be reversed in order to obtain discharge of a desired amount of liquid into the liquid chambers 20 for each stroke of the piston.

In practice, the four valves 58,59,60, and 61 may be replaced by a single valve device as that illustrated in FIG. 10. This valve device comprises four hoses or compressible tubes 58', 59', 60', and 61'. The device also comprises a solenoid 64 with an armature 65 having a loop-shaped member fastened to its free end. The valve device also comprises an abutment member 67, and the members 66 and 67 are arranged so in relation to each other that the tubes 58' and 61', which correspond to the valves 58 and 61 are closed when the loop-shaped member 66 is in its lower position, while the tubes 59' and 60', which correspond to the valves 59 and 60 in FIG. 11 are open, and vice versa, when the loop-shaped member 66 is in its upper position. It is understood that the operation of the hydraulic cylinder 36 may be controlled by controlling the movement of the armature 65 and the loop-shaped member connected thereto between a lower and upper position by means of the solenoid 64.

It should be understood that various modifications and changes of the embodiments shown on the drawings may be made within the scope of the present invention. As an example, the driving medium for the cylinder 36 may be pressurized air, or the cylinder 36 may be replaced by any other driving device. The feeding apparatus may then be provided with other types of liquid metering devices.

I claim:

1. A method of operating an animal feeding apparatus having dry feed or fodder supply means driven by a driving device for supplying amounts of dry feed or fodder to at least one animal feeding place, and liquid supply means for supplying aqueous liquid to each said feeding place, said method comprising:
   (a) supplying the aqueous liquid to the driving device under superatmospheric pressure;
   (b) using said aqueous liquid as a driving medium for operating the driving device to supply the dry feed or fodder to the feeding place in an amount substantially proportional to the amount of the aqueous liquid supplied to the driving device;
   (c) discharging the aqueous liquid from the driving device after step (b); and
   (d) dispensing all or a predetermined proportion of said liquid into the feeding place to produce a feed mixture therein containing a predetermined proportion of said liquid and said dry feed or fodder.

2. A method according to claim 1, wherein the feeding apparatus comprises a plurality of separate feeding places, said method further comprising dividing the liquid discharged from the driving device into a number of substantially equal portions corresponding to the number of feeding places, and supplying these portions to the respective feeding places.

3. In an animal feeding apparatus comprising a dry feed or fodder supply means for supplying amounts of dry feed or fodder to at least one animal feeding place, a liquid supply means for supplying aqueous liquid to each said feeding place, and said feeding place, the improvement comprising:
   (a) a hydraulic motor coupled to said dry feed or fodder supply means for driving said means;
   (b) means coupling said liquid supply means to said motor for supplying said liquid to the motor under superatmospheric pressure as a driving medium therefor;
   (c) operating means for driving said motor to supply the dry feed or fodder in an amount substantially proportional to the amount of said liquid utilized as a driving medium for said motor; and (d) discharge means for discharging said liquid from said motor and for dispensing all or a predetermined proportion of said liquid into said feeding place to produce a feed mixture in the feeding place containing a predetermined proportion of said liquid and said dry feed or fodder.

4. An apparatus according to claim 3, wherein the motor is of the type having a reciprocatable driving member.

5. An apparatus according to claim 4, wherein the driving member is a piston displaceably arranged within a cylinder.

6. An apparatus to claim 4, wherein the hydraulic motor is of the double-acting type.

7. An apparatus according to claim 4, wherein the driving member of the hydraulic motor is connected to the fodder supply means through a rod and a connecting adjustable lost motion connection.

8. An apparatus according to claim 3, wherein said discharge means comprise liquid distributing means for supplying substantially equal portions of the discharged liquid to a plurality of feeding places.

9. An apparatus according to claim 8, wherein the liquid distributing means comprise a liquid receiving chamber having a plurality of outlets opening into the receiving chamber at substantially the same level, and each of the outlets being associated with a respective one of the feeding places.

10. An apparatus according to claim 9, wherein each outlet is in the form of a tube having an open end adjacent to a top wall of the receiving chamber and extending downwardly through a bottom wall of the chamber, the upper open end of each tube having an end surface defining an acute angle with the longitudinal axis of the tube.

11. An apparatus according to claim 3, wherein the fodder supply means comprises at least one fodder supply duct having a lower outlet end located above and closely spaced from an opposite fodder supporting wall, and a fodder pushing means arranged between the outlet end of the fodder supply duct and the adjacent supporting wall and being movable so as to push consecutive amounts of feed or fodder from the fodder supply duct, the fodder pushing means having leading edge portions defining a concave shape and a through-going relief passage extending between the bottom of the concave shape of the leading edge portions and the trailing edge portions of the pushing means.

12. An apparatus according to claim 11, wherein each of the plate members has a substantially triangular shape, the overlapping free ends of the plate members forming vertices of the triangles.

13. An apparatus according to claim 11, wherein at least part of the the relief passage extends along a direction deviating substantially from the direction of movement of the pushing means.

14. An apparatus according to claim 13, wherein the pushing means comprises a pair of plate members extending from opposite sides of the outlet end of the fodder supply duct and transversely to the direction of movement of the pushing means, the plate members having overlapping free end portions, which are spaced in said direction of movement so as to define the relief passage between the plate members.

15. An apparatus according to claim 11, further comprising a plurality of spaced fodder supply ducts, which are arranged in a row, fodder discharge openings communicating with the respective feeding places being defined between each pair of consecutive fodder supply ducts and below the fodder pushing means, and the fodder pushing means of the various fodder supply ducts being interconnected and connected to a common driving device.

16. An apparatus according to claim 15, wherein the fodder supply ducts are arranged in a rectilinear row, the trailing edge portions of each fodder pushing means having substantially the same concave shape as the leading edge portions thereof, and the driving device being adapted to reciprocate the interconnected pushing means with a stroke length substantially corresponding to the length between two adjacent discharge openings.

17. An animal feeding apparatus comprising fodder supply means for feeding dry feed or fodder to at least one feeding place, said fodder supply means comprising at least one fodder supply duct having a lower outlet end located above and closely spaced from an opposite fodder supporting wall, and a fodder pushing means arranged between the outlet end of the fodder supply duct and the adjacent supporting wall and being movable so as to push consecutive amounts of feed or fodder from the fodder supply duct, the fodder pushing means having leading edge portions defining a concave shape and a through-going relief passage extending between the bottom of the concave shape of the leading edge portions and the trailing edge portions of the pushing means.

18. An apparatus according to claim 17, wherein at least part of the relief passage extends in a direction deviating substantially from the direction of movement of the pushing means.

19. An apparatus according to claim 17, further comprising means for adjusting the vertical position of the outlet end of each of the fodder supply ducts.

20. An apparatus according to claim 17, further comprising a plurality of spaced fodder supply ducts, which are arranged in a row, fodder discharge openings communicating with the respective feeding places being defined between each pair of consecutive fodder supply ducts and below the fodder pushing means, and the fodder pushing means of the various fodder supply ducts being interconnected and connected to a common driving device.

21. An apparatus according to claim 20, wherein the trailing edge portions of each fodder pushing means have substantially the same concave shape as the leading edge portions thereof, the driving device being adapted to reciprocate the interconnected pushing means with a stroke length substantially corresponding to the spacing of two adjacent discharge openings.

22. An apparatus according to claim 21, wherein the fodder supporting walls of the various fodder supply ducts are formed by a common first channel member having the fodder discharge openings formed therein, the fodder pushing means of the various fodder supply ducts being formed in the bottom wall of a corresponding common second channel member, which is slidingly received in the first channel member.

23. An animal feeding apparatus comprising dry feed or fodder supply means for feeding dry feed or fodder to at least one animal feeding place, said dry feed or fodder supply means comprising:
(a) at least one fodder supply duct having a lower outlet end located above and closely spaced from a opposite fodder supporting wall; and (b) a fodder pushing means arranged between the outlet end of the fodder supply duct and the adjacent supporting wall and being movable so as to push consecutive amounts of dry feed or fodder from the fodder supply duct, the fodder pushing means comprising a pair of plate members extending from opposite sides of the outlet end of the fodder supply duct and transversely to the direction of movement of the pushing means, the plate members having leading edge portions defining a concave shape and a through-going relief passage extending between the bottom of the concave shape of the leading edge portions and the trailing edge portions of the pushing means and, at least in part, deviating substantially from the direction of movement of the pushing means, and overlapping free end portions which are spaced in the said direction of movement so as to define said relief passage between the plate members.

24. An apparatus according to claim 23, wherein each of the plate members has a substantially triangular shape, and the overlapping free ends of the plate members forming vertices of the triangles.

* * * * *